US011089722B2

(12) United States Patent
McLuckie et al.

(10) Patent No.: US 11,089,722 B2
(45) Date of Patent: Aug. 17, 2021

(54) SCRAPER ASSEMBLY OF AN AGRICULTURAL ROW UNIT (71) Applicant: CNH Industrial America LLC, New Holland, PA (US)

(72) Inventors: Austin Joseph McLuckie, Coal City, IL (US); Brian J. Anderson, Yorkville, IL (US); Johnathon R. Dienst, Maple Park, IL (US); Grant Thomas MacDonald, Hampshire, IL (US)

(73) Assignee: CNH Industrial America LLC, New Holland, PA (US)

( * ) Notice: Subject to any disclaimer, the term of this patent is extended or adjusted under 35 U.S.C. 154(b) by 234 days.

(21) Appl. No.: 16/287,894

(22) Filed: Feb. 27, 2019

(65) Prior Publication Data
US 2020/0267882 A1    Aug. 27, 2020

(51) Int. Cl.
| *A01B 15/16* | (2006.01) |
| *A01C 5/06* | (2006.01) |
| *A01B 5/04* | (2006.01) |
| *A01C 7/04* | (2006.01) |

(52) U.S. Cl.
CPC ............. *A01B 15/16* (2013.01); *A01B 5/04* (2013.01); *A01C 5/064* (2013.01); *A01C 7/04* (2013.01)

(58) Field of Classification Search
CPC ........... A01B 5/04; A01B 15/16; A01C 5/064; A01C 7/04
See application file for complete search history.

(56) References Cited

U.S. PATENT DOCUMENTS

| 733,593 | A | | 7/1903 | Poirier | |
| 785,865 | A | * | 3/1905 | Davis | A01C 5/064 |
| | | | | | 172/559 |
| 845,425 | A | | 2/1907 | Livesay | |
| 866,622 | A | * | 9/1907 | Christman | A01B 15/16 |
| | | | | | 172/560 |
| 882,056 | A | * | 3/1908 | Folkerts | A01B 15/16 |
| | | | | | 172/560 |

(Continued)

FOREIGN PATENT DOCUMENTS

| CN | 201938044 | 8/2011 |
| CN | 204031764 | 12/2014 |

(Continued)

OTHER PUBLICATIONS

TD16B Tyne Disc Opener Assembly 50x16; http://www.bossagparts.com.au/TD16-Tyne-Disc-Opener-50-X-16-Assembly; 2 pgs; accessed Jan. 21, 2019.

(Continued)

*Primary Examiner* — Thomas B Will
*Assistant Examiner* — Ian A Normile
(74) *Attorney, Agent, or Firm* — Rebecca L. Henkel; Rickard K. DeMille (57) ABSTRACT

A scraper assembly of an agricultural row unit includes an inner scraper configured to engage an inner surface of a disc. The scraper assembly also includes a fastener configured to couple the inner scraper to an outer scraper configured to engage an outer surface of the disc. In addition, the inner scraper has an engagement feature configured to contact the outer scraper and/or a frame of the agricultural row unit to block rotation of the inner scraper about the fastener relative to the outer scraper.

15 Claims, 7 Drawing Sheets

(56) References Cited

U.S. PATENT DOCUMENTS

| | | | |
|---|---|---|---|
| 1,113,776 A | | 10/1914 | Goetz |
| 1,129,848 A | | 3/1915 | Cast |
| 1,204,306 A | | 11/1916 | Offerman |
| 1,264,970 A | | 5/1918 | Pilfer |
| 1,545,895 A | | 7/1925 | Hamilton |
| 2,242,608 A | | 8/1938 | Graves |
| 3,589,569 A | * | 6/1971 | Bonetti ............... B01F 5/0496 222/250 |
| 3,833,067 A | | 9/1974 | Peterson, Jr. et al. |
| 4,034,888 A | | 7/1977 | Ernst |
| 4,113,030 A | | 9/1978 | Walker |
| 4,206,817 A | | 6/1980 | Bowerman |
| 4,337,835 A | | 7/1982 | Steilen |
| 4,603,746 A | | 8/1986 | Swales |
| 4,736,803 A | | 4/1988 | Roush |
| 5,060,586 A | | 10/1991 | Hoyt |
| 6,237,697 B1 | * | 5/2001 | Butterfield ........... A01B 63/045 172/558 |
| 7,984,768 B2 | | 7/2011 | Schilling |
| 9,769,971 B2 | | 9/2017 | Hesla |

FOREIGN PATENT DOCUMENTS

| | | |
|---|---|---|
| CZ | 293891 | 8/2004 |
| DE | 202007015632 | 3/2009 |

OTHER PUBLICATIONS

Part #TS455, Tungsten Scraper Kit, Shoup Parts, https://www.shoupparts.com/TS455-Tungsten-Scraper-Kit-For-John-Deere-Grain-Drills, viewed Feb. 5, 2019, 2 pgs.

Part #RDS201, Rotating Disc Scraper, Shoup Parts, https://www.shoupparts.com/RDS201-Rotating-Disc-Scraper, viewed Feb. 5, 2019, 2 pgs.

Air Design, AD21070 John Deere Pro Inside Planter Scrapers, https://www.airdesignscrapers.com/store/index.php?I=product_detail&p=17, viewed Feb. 5, 2019, 1 pg.

Air Design, AD21092 Salford 500 Series Precision Disc Drill Scraper, https://www.airdesignscrapers.com/store/index.php?I=product_detail&p=45, viewed Feb. 5, 2019, 1 pg.

U.S. Appl. No. 16/374,869, filed Apr. 4, 2019, McLuckie.

* cited by examiner

SCRAPER ASSEMBLY OF AN AGRICULTURAL ROW UNIT

BACKGROUND

The present disclosure relates generally to a scraper assembly of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds/other agricultural products.

Certain row units include a scraper assembly having an outer scraper configured to remove accumulated soil from an outer surface of the ground engaging tool/opener. For example, the ground engaging tool/opener may include an opener disc, and soil may accumulate on the outer surface of the opener disc during formation of the seeding path/trench. Accordingly, the outer scraper of the scraper assembly may contact the outer surface of the opener disc, thereby removing accumulated soil from the outer surface of the opener disc during formation of the seeding path/trench. The frame of the row unit may be configured to receive the outer scraper, thereby enabling the outer scraper to be mounted to the frame. Soil may also accumulate on the inner surface of the opener disc during operation of the row unit. However, certain row units have a frame that is not configured to receive an inner scraper (e.g., the frame does not include a mounting system for an inner scraper). Unfortunately, adding an inner scraper to such a row unit may be expensive (e.g., the frame may be replaced with a frame configured to receive an inner scraper), or may involve a complex and time-consuming process (e.g., the frame may be modified to receive an inner scraper).

BRIEF DESCRIPTION

In certain embodiments, a scraper assembly of an agricultural row unit includes an inner scraper configured to engage an inner surface of a disc. The scraper assembly also includes a fastener configured to couple the inner scraper to an outer scraper configured to engage an outer surface of the disc. In addition, the inner scraper has an engagement feature configured to contact the outer scraper and/or a frame of the agricultural row unit to block rotation of the inner scraper about the fastener relative to the outer scraper.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
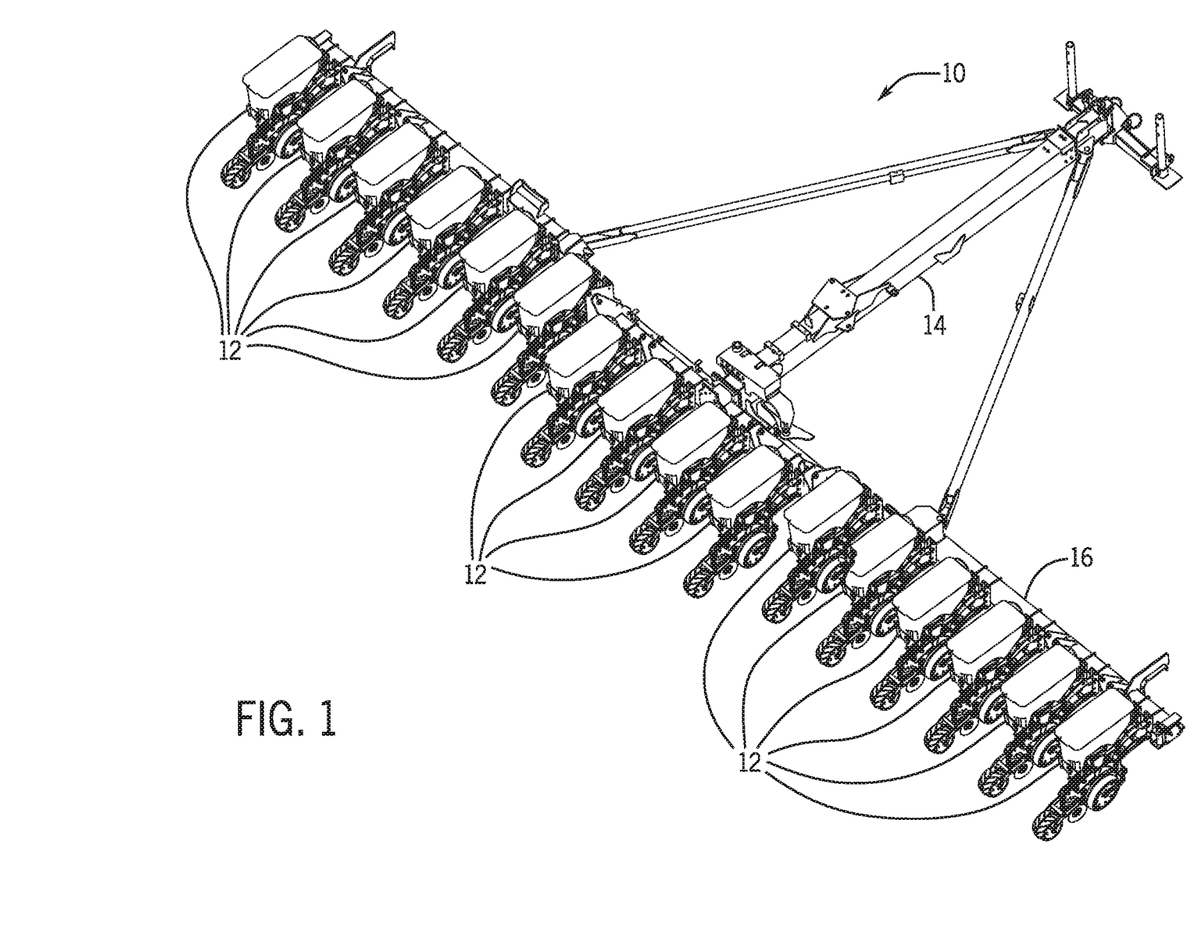
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s).

During operation of the row units 12, clumps of soil may accumulate on the opener discs (e.g., due to moist soil conditions, etc.). Accordingly, in certain embodiments, at least one row unit 12 may include a scraper assembly configured to remove accumulated soil from the opener disc(s) as the opener disc(s) form the seed path/trench. As discussed in detail below, the scraper assembly may include an inner scraper engaged with an inner surface of the opener disc and configured to remove accumulated soil from the inner surface of the opener disc, and the scraper assembly may include an outer scraper engaged with an outer surface of the opener disc and configured to remove accumulated soil from the outer surface of the opener disc. The outer scraper may be coupled to a frame of the row unit, and a fastener of the scraper assembly may couple the inner scraper to the other scraper. In addition, the inner scraper may have an engagement feature (e.g., at least one arm) configured to contact the outer scraper and/or the frame of the row unit to block rotation of the inner scraper about the fastener relative to the outer scraper. Because the scraper assembly includes an inner scraper and an outer scraper, accumulated soil may be removed from both sides of the opener disc, thereby enhancing the accuracy and efficiency of the seed path/trench forming process. In addition, because the inner scraper and the fastener are not directly coupled to the frame of the row unit, the inner scraper may be employed on row unit frames that are only configured to receive outer scraper(s). Accordingly, an inner scraper may be added to an existing row unit, thereby facilitating removal of accumulated soil from the inner surface of the opener disc, without replacing or modifying the row unit frame. As a result, the cost associated with adding the functionality of an inner scraper may be substantially reduced (e.g., as compared to replacing the row unit frame with a frame configured to receive an inner scraper).

Figure 2:
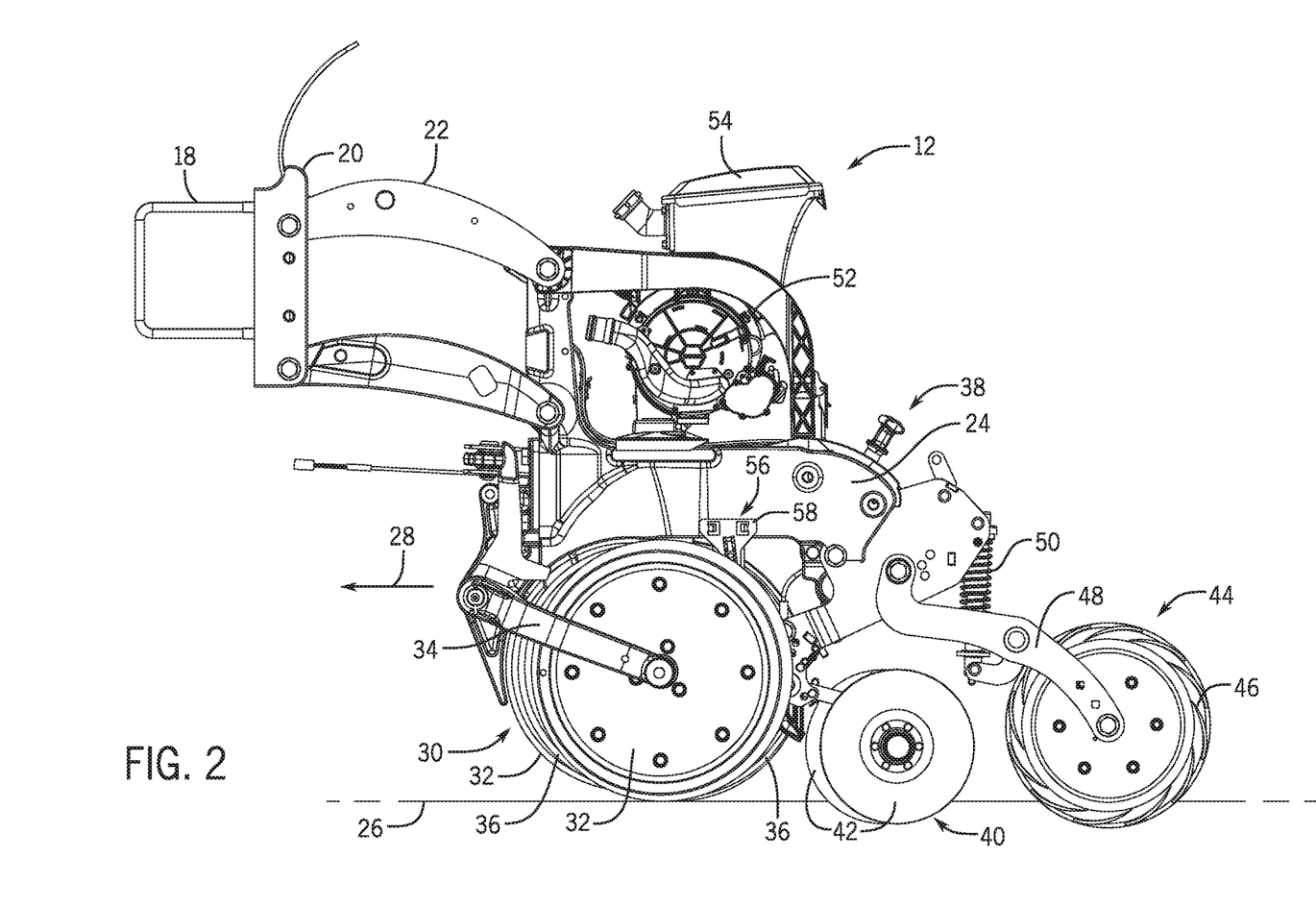
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 is configured to deposit seeds and/or other agricultural product(s) at a desired depth beneath the soil surface 26 as the row unit 12 traverses a field along a direction of travel 28. The row unit 12 includes an opener assembly 30 that forms a trench in the soil for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 also includes an agricultural product conveying system (e.g., seed tube or powered agricultural product conveyor) configured to deposit seeds and/or other agricultural product(s) (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, in alternative embodiments, the closing assembly may include other closing devices (e.g., a single closing disc, etc.). In addition, in certain embodiments, the closing assembly may be omitted. In the illustrated embodiment, the closing assembly 40 is followed by a packing assembly 44 configured to pack soil on top of the deposited seeds and/or other agricultural product(s). The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited seeds and/or other agricultural product(s). While the illustrated biasing member 50 includes a spring, in alternative embodiments, the biasing member may include another suitable biasing device, such as a hydraulic cylinder or a pneumatic cylinder, among others.

The row unit 12 includes a vacuum seed meter 52 configured to receive agricultural product (e.g., seeds) from a hopper 54. In certain embodiments, the vacuum seed meter 52 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in alternative embodiments, other suitable seed/agricultural product meters may be utilized. As used herein, "vacuum" refers to an air pressure that is less than the ambient atmospheric air pressure, and not necessarily 0 pa.

In the illustrated embodiment, the row unit 12 includes a scraper assembly 56 having an outer scraper 58 (e.g., first outer scraper) coupled to the frame 24 and configured to engage an outer surface of an opener disc 36 (e.g., first disc). Furthermore, as discussed in detail below, the scraper assembly 56 includes an inner scraper (e.g., first inner scraper) configured to engage an inner surface of the opener disc 36. The scraper assembly also includes a fastener (e.g., first fastener) coupling the inner scraper to the outer scraper 58. The inner scraper has an engagement feature (e.g., at least one arm) in contact with the outer scraper 58 and/or the frame 24 to block rotation of the inner scraper about the fastener relative to the outer scraper. Because the scraper assembly 56 includes an inner scraper and an outer scraper 58, accumulated soil may be removed from both sides of the opener disc 36, thereby enhancing the accuracy and efficiency of the seed path/trench forming process. Furthermore, in certain embodiments, the scraper assembly may include a second inner scraper and a second outer scraper configured to remove accumulated soil from a second opener disc of the row unit.

Figure 3:
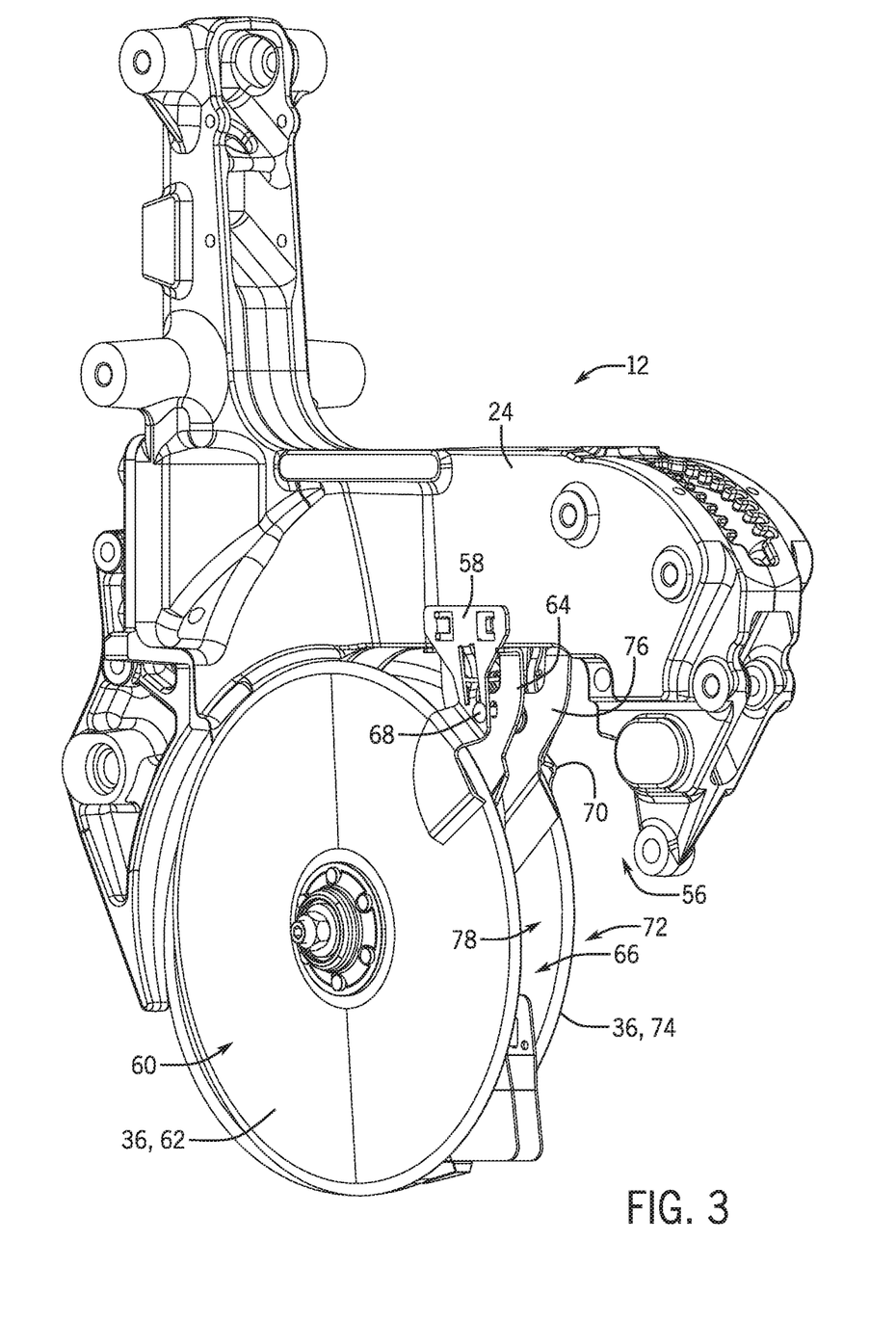
FIG. 3 is a perspective view of a portion of the row unit of FIG. 2, including an embodiment of a scraper assembly.

FIG. 3 is a perspective view of a portion of the row unit 12 of FIG. 2, including an embodiment of a scraper assembly 56. In the illustrated embodiment, the scraper assembly 56 includes a first outer scraper 58 configured to engage an outer surface 60 of a first opener disc 62, and the scraper assembly 56 includes a first inner scraper 64 configured to engage an inner surface 66 of the first opener disc 62. Furthermore, as discussed in detail below, the first outer scraper 58 is coupled to the frame 24 of the row unit 12. The scraper assembly 56 also includes a fastener 68 that couples the first inner scraper 64 to the first outer scraper 58. In addition, the first inner scraper 64 has an engagement feature (e.g., at least one arm) in contact with the first outer scraper 58 and/or the frame 24 to block rotation of the first inner scraper 64 about the first fastener 68 relative to the first outer scraper 58.

In the illustrated embodiment, the scraper assembly 56 also includes a second outer scraper 70 coupled to the frame 24 of the row unit 12 and configured to engage an outer surface 72 of a second opener disc 74. In addition, the scraper assembly 56 includes a second inner scraper 76 configured to engage an inner surface 78 of the second opener disc 74. Furthermore, the scraper assembly 56 includes a second fastener that couples the second inner scraper 76 to the second outer scraper 70. Similar to the first inner scraper 64, the second inner scraper 76 has an engagement feature (e.g., at least one arm) in contact with the second outer scraper 70 and/or the frame 24 of the row unit 12 to block rotation of the second inner scraper 76 about the second fastener relative to the second outer scraper 70. While the scraper assembly 56 includes two pairs of inner/outer scrapers in the illustrated embodiment, in other embodiments, the scraper assembly may include more or fewer pairs of inner/outer scrapers (e.g., 1, 2, 3, 4, 5, 6, or more). For example, the scraper assembly may include one pair of inner/outer scrapers for each opener disc of the row unit.

Because the scraper assembly 56 includes an inner scraper and an outer scraper for each opener disc 36, accumulated soil may be removed from both the inner surface and the outer surface of each opener disc 36. As a result, the accuracy and efficiency of the seed path/trench forming process may be enhanced (e.g., as compared to a scraper assembly having only inner scraper(s) or only outer scraper(s)). In addition, because the inner scrapers and the fasteners are not directly coupled to the frame of the row unit, the inner scrapers may be employed on row unit frames that are only configured to receive outer scraper(s). Accordingly, inner scraper(s) may be added to an existing row unit (e.g., having a frame configured to receive only outer scraper(s)), thereby facilitating removal of accumulated soil from the inner surface(s) of the opener disc(s), without replacing or modifying the row unit frame. As a result, the cost associated with adding the functionality of inner scraper(s) may be substantially reduced (e.g., as compared to replacing the row unit frame with a frame configured to receive inner scraper(s)).

Figure 4:
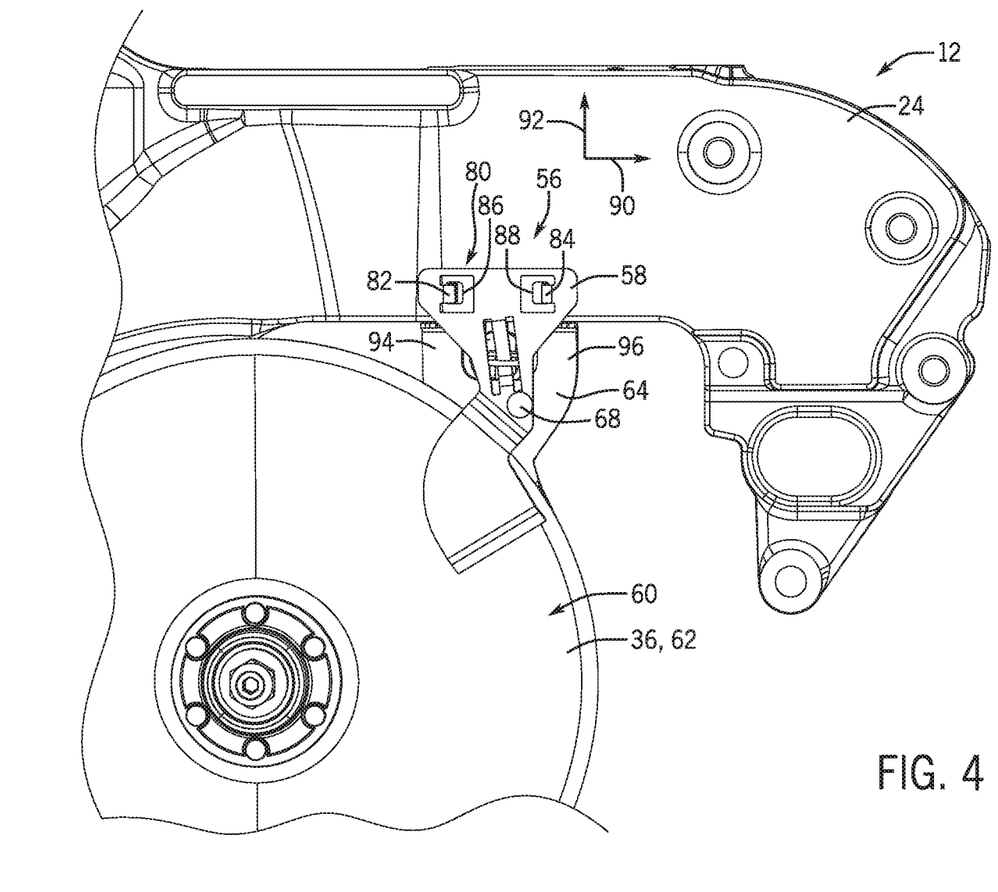
FIG. 4 is a side view of the scraper assembly of FIG. 3.

FIG. 4 is a side view of the scraper assembly 56 of FIG. 3. As previously discussed, the first outer scraper 58 is coupled to the frame 24 of the row unit 12. In the illustrated embodiment, the first outer scraper 58 is coupled to the frame 24 via a mounting system 80. The mounting system 80 includes a first protrusion 82 and a second protrusion 84. The first protrusion 82 is configured to engage a first recess 86 in the frame 24, and the second protrusion 84 is configured to engage a second recess 88 in the frame 24. The first and second protrusions are biased away from one another along a longitudinal axis 90 of the row unit 12. Accordingly, contact between the first protrusion 82 and the frame 24 at a longitudinal end of the first recess 86 and contact between the second protrusion 84 and the frame 24 at a longitudinal end of the second recess 88 couples the first outer scraper 58 to the frame 24. In addition, contact between the first protrusion 82 and the frame 24 at vertical ends of the first recess 86 (e.g., ends of the first recess 86 along a vertical axis 92 of the row unit) and contact between the second protrusion 84 and the frame 24 at vertical ends of the second recess 88 (e.g., ends of the second recess 88 along the vertical axis 92) blocks rotation of the first outer scraper 58 relative to the frame 24 about a lateral axis of the row unit 12.

While the illustrated mounting system 80 has two protrusions configured to engage two respective recesses, in other embodiments, the mounting system may have more or fewer protrusions (e.g., 1, 2, 3, 4, 5, 6, or more) configured to engage a corresponding number of recesses. In addition, in alternative embodiments, the mounting system may have any other suitable structure configured to couple the outer scraper to the frame. Furthermore, while the mounting system 80 of the first outer scraper 58 is described above, in certain embodiments, the second outer scraper may be coupled to the frame of the row unit by substantially the same mounting system. However, in other embodiments, the second outer scraper may be coupled to the frame by a different suitable mounting system.

As previously discussed, the first inner scraper 64 is coupled to the first outer scraper 58 by the first fastener 68. In the illustrated embodiment, the first inner scraper 64 has an engagement feature, such as the illustrated first arm 94 and second arm 96, configured to contact the first outer scraper 58 and/or the frame 24 to block rotation of the first inner scraper 64 about the fastener 68 relative to the first outer scraper 58. The first and second arms are positioned on opposite sides of the first outer scraper 58 along the longitudinal axis 90, and each arm is in contact with the first outer scraper 58. As illustrated, contact between the first arm 94 and the first outer scraper 58 and contact between the second arm 96 and the first outer scraper 58 blocks rotation of the inner scraper 64 about the first fastener 68 (e.g., about the lateral axis of the row unit) relative to the first outer scraper 58. In addition, the first arm 94 and the second arm 96 of the first inner scraper 64 contact the frame 24. Contact between the first arm 94 and the frame 24 and contact between the second arm 96 and the frame 24 blocks rotation of the inner scraper 64 about the fastener 68 (e.g., about the lateral axis of the row unit) relative to the frame 24. Because rotation of the first outer scraper 58 about the lateral axis relative to the frame 24 is blocked by the mounting system 80, contact between the arms and the frame 24 also blocks rotation of the first inner scraper 64 about the first fastener 68 relative to the first outer scraper 58. Because rotation of the first inner scraper 64 about the fastener 68 relative to the frame 24/first outer scraper 58 is blocked, the orientation of the first inner scraper 64 about the lateral axis relative to the first opener disc 62 may be substantially maintained during operation of the row unit 12, thereby enabling the first inner scraper 64 to effectively remove accumulated soil from the inner surface of the first opener disc 62.

While the first inner scraper 64 has two arms in the illustrated embodiment, in other embodiments, the first inner scraper may have more or fewer arms (e.g., 1, 2, 3, 4, 5, 6, or more) configured to contact the first outer scraper and/or the frame to block rotation of the first inner scraper about the first fastener relative to the first outer scraper. In addition, while each arm of the first inner scraper 64 is configured to contact the frame 24 and the first outer scraper 58 in the illustrated embodiment, in other embodiments, at least one arm may be configured to only contact the frame or to only contact the first outer scraper to block rotation of the first inner scraper about the first fastener relative to the first outer scraper. While the arms of the first inner scraper 64 are described above, in certain embodiments, the second inner scraper may have substantially similar arms to block rotation of the second inner scraper about the second fastener relative to the second outer scraper. However, in other embodiments, the second inner scraper may have a suitable arm configuration different from the arm configuration of the first inner scraper.

Figure 5:
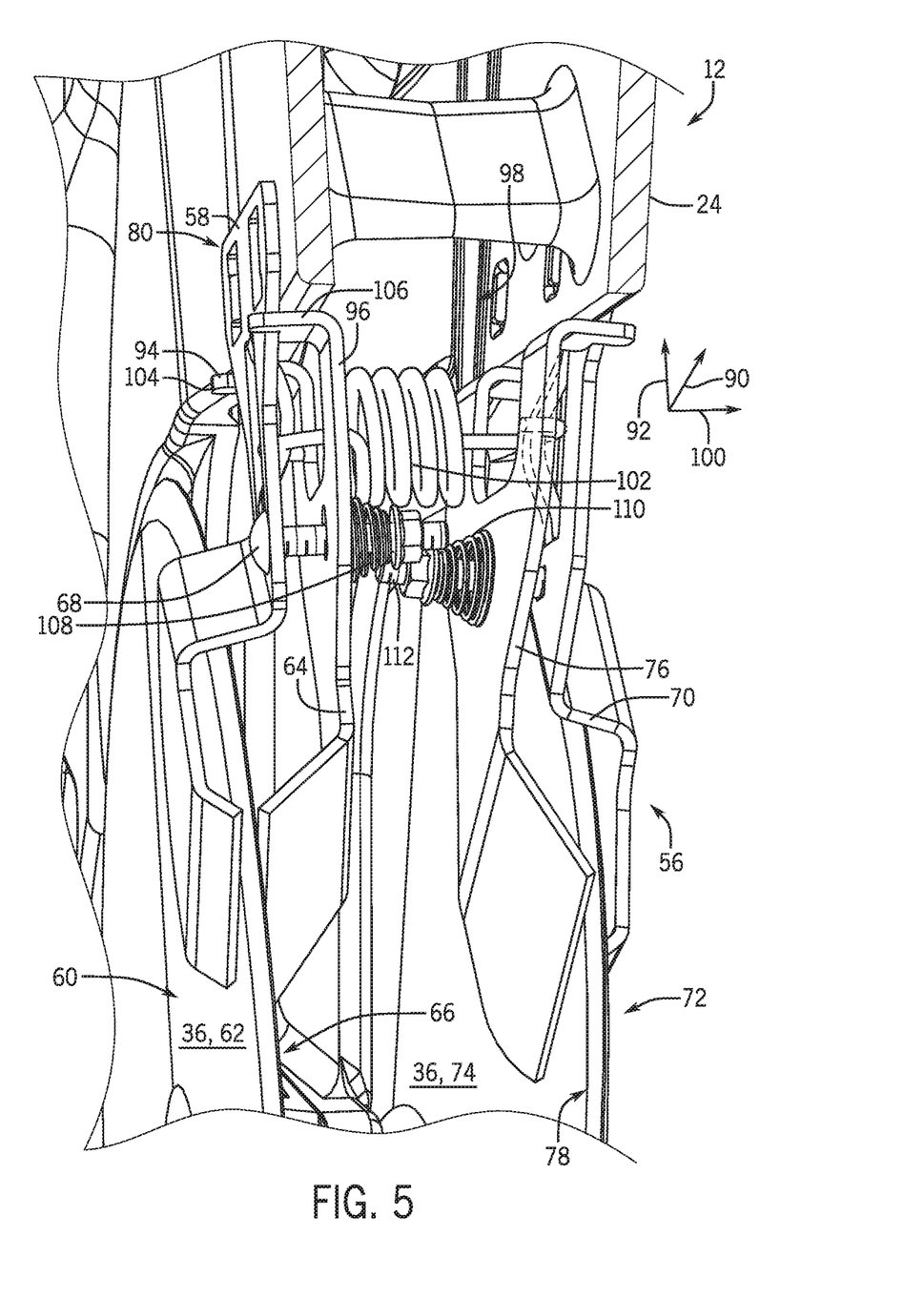
FIG. 5 is a perspective view of the scraper assembly of FIG. 3.

FIG. 5 is a perspective view of the scraper assembly 56 of FIG. 3. As illustrated, the first outer scraper 58 is in contact with the outer surface 60 of the first opener disc 62, and the first inner scraper 64 is in contact with the inner surface 66 of the first opener disc 62. Accordingly, the first outer scraper 58 may remove accumulated soil from the outer surface 60 of the first opener disc 62, and the first inner scraper 64 may remove accumulated soil from the inner surface 66 of the first opener disc 62. In addition, the second outer scraper 70 is in contact with the outer surface 72 of the second opener disc 74, and the second inner scraper 76 is in contact with the inner surface 78 of the second opener disc 74. Accordingly, the second outer scraper 70 may remove accumulated soil from the outer surface 72 of the second opener disc 74, and the second inner scraper 76 may remove accumulated soil from the inner surface 78 of the second opener disc 74.

In the illustrated embodiment, the scraper assembly 56 includes a biasing system 98 coupled to the first outer scraper 58 and to the second outer scraper 70. The biasing system 98 is configured to urge the first outer scraper 58 toward the first opener disc 62 along a lateral axis 100 of the row unit, and the biasing system 98 is configured to urge the second outer scraper 70 toward the second opener disc 74 along the lateral axis 100. Accordingly, the biasing system urges contact between the first outer scraper 58 and the outer surface 60 of the first opener disc 62 and between the second outer scraper 70 and the outer surface 72 of the second opener disc 74. In the illustrated embodiment, the biasing system 98 includes a coil spring 102 having a first end coupled to the first outer scraper 58 and a second end coupled to the second outer scraper 70. However, in other embodiments, the biasing system may include other and/or additional elements configured to urge the outer scrapers toward the respective opener discs. For example, the biasing system may include one or more coil springs, one or more springs of another suitable type (e.g., leaf spring(s), etc.), one or more other suitable biasing elements (e.g., an elastic polymeric element, etc.), or a combination thereof. Furthermore, in certain embodiments, the biasing system may include a first biasing element extending between the frame and the first outer scraper and configured to urge the first outer scraper toward the first opener disc, and the biasing system may include a second biasing element extending between the frame and the second outer scraper and configured to urge the second outer scraper toward the second opener disc.

As previously discussed, the first inner scraper 64 has a first arm 94 and a second arm 96 configured to contact the first outer scraper 58 and the frame 24 to block rotation of the first inner scraper 64 about the first fastener 68 relative to the first outer scraper 58. In the illustrated embodiment, the first arm 94 has a bent portion 104, and the second arm 96 has a bent portion 106. As illustrated, a top surface of each bent portion contacts the frame 24 of the row unit 12 to block rotation of the first inner scraper about the first fastener 68 relative to the first outer scraper 58. As used herein, "contacts the frame" refers to contact between the arm and any suitable portion of the frame (e.g., including elements rigidly coupled to a main structure of the frame). In addition, the bent portion of each arm is configured to contact the first outer scraper 58 to block rotation of the first inner scraper about the first fastener 68 relative to the first outer scraper 58. While each arm has a bent portion in the illustrated embodiment, in other embodiments, the bent portion may be omitted from at least one arm of the first inner scraper. Furthermore, in the illustrated embodiment, each arm of the second inner scraper 76 has a respective bent portion. However, in other embodiments, the bent portion may be omitted from at least one arm of the second inner scraper.

In the illustrated embodiment, the scraper assembly 56 includes a first biasing member 108 configured to urge the first inner scraper 64 toward the first opener disc 62. In addition, the scraper assembly 56 includes a second biasing member 110 configured to urge the second inner scraper 76 toward the second opener disc 74. In the illustrated embodiment, the first biasing member 108 includes a first coil spring disposed about the first fastener 68, and the second biasing member 110 includes a second coil spring disposed about the second fastener 112. However, in other embodiments, at least one of the biasing members may include another and/or an additional element configured to urge the respective inner scraper toward the respective opener disc. Urging each inner scraper toward the respective opener disc enables the inner scraper to remove accumulated soil from the inner surface of the respective opener disc. In addition, because each inner scraper is urged toward the respective opener disc, contact between the inner scraper and the respective opener disc may be substantially maintained during operation of the row unit (e.g., as compared to an inner scraper that is fixed to the frame and wears over time, thereby establishing a gap between the inner scraper and the respective opener disc).

Because the scraper assembly 56 includes an inner scraper and an outer scraper for each opener disc 36, accumulated soil may be removed from both the inner surface and the outer surface of each opener disc 36. As a result, the accuracy and efficiency of the seed path/trench forming process may be enhanced (e.g., as compared to a scraper assembly having only inner scrapers or only outer scrapers). In addition, because the inner scrapers and the fasteners are not directly coupled to the frame of the row unit, the inner scrapers may be employed on row unit frames that are only configured to receive outer scrapers. Accordingly, inner scrapers may be added to an existing row unit (e.g., having a frame configured to receive only outer scrapers), thereby facilitating removal of accumulated soil from the inner surfaces of the opener discs, without replacing or modifying the row unit frame. As a result, the cost associated with adding the functionality of inner scrapers may be substantially reduced (e.g., as compared to replacing the row unit frame with a frame configured to receive inner scrapers).

Figure 6:
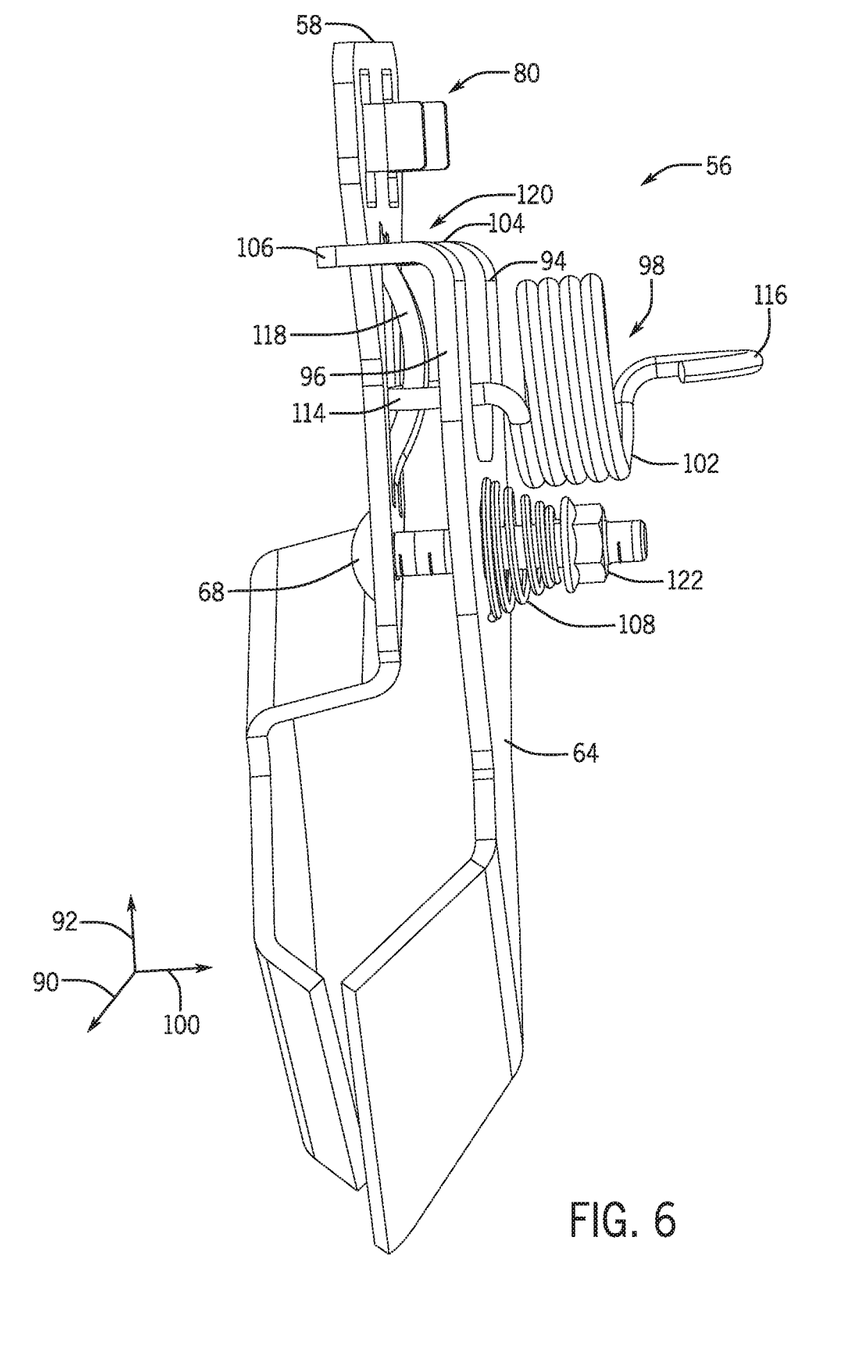
FIG. 6 is a back view of a portion of the scraper assembly of FIG. 3.

FIG. 6 is a back view of a portion of the scraper assembly 56 of FIG. 3. As previously discussed, the coil spring 102 of the biasing system 98 has a first end 114 coupled to the first outer scraper 58 and a second end 116 coupled to the second outer scraper. In the illustrated embodiment, each end of the coil spring 102 forms a hook configured to engage a bar 118 of the respective outer scraper. Accordingly, the coil spring 102 urges the outer scrapers toward one another, and toward their respective opener discs, along the lateral axis 100. In the illustrated embodiment, the first arm 94 and the second arm 96 of the first inner scraper 64 form a gap 120 that enables the coil spring 102 to pass through the first inner scraper 64 to the first outer scraper 58. In certain embodiments, the arms of the second inner scraper also form a gap that enables the coil spring to pass through the second inner scraper to the second outer scraper.

In the illustrated embodiment, the first biasing member 108 includes a coil spring disposed about the first fastener 68 and configured to urge the first inner scraper 64 toward the respective opener disc. As illustrated, the coil spring is positioned between the first inner scraper 64 and a retaining element 122 coupled to the first fastener 68. In the illustrated embodiment, the retaining element 122 is a nut engaged with threads of the first fastener 68. However, in other embodiments, the retaining element may be any other suitable structure configured to retain the coil spring (e.g., a pin, a clip, etc.). Furthermore, in the illustrated embodiment, the coil spring has a conical shape to control the force applied to the first inner scraper 64. For example, the conically shaped coil spring may have a spring constant that varies in response to compression of the coil spring (e.g., the spring constant may increase as the coil spring compresses). As a result, the coil spring may cause a target force to be applied by the first inner scraper to the first opener disc. In addition, the position of the retaining element 122 may be selected (e.g., by rotating the nut about the threaded portion of the first fastener) to control the force applied by the first inner scraper to the first opener disc.

While the coil spring has a conical shape in the illustrated embodiment, in other embodiments, the coil spring may have another suitable shape (e.g., cylindrical, etc.) to control the force applied by the first inner scraper to the first opener disc. In addition, the coil spring may include other and/or additional features to control the force of the coil spring (e.g., variable coil pitch, variable coil thickness, etc.). Furthermore, while the first biasing member includes a single coil spring in the illustrated embodiment, in other embodiments, the first biasing member may include other and/or additional element(s) to urge the first inner scraper toward the first opener disc. In addition, while the first biasing member is described above, the second biasing member, which is configured to urge the second inner scraper toward the second opener disc, may include a substantially similar coil spring and/or any other suitable element(s) configured to urge the second inner scraper toward the second opener disc.

Figure 7:
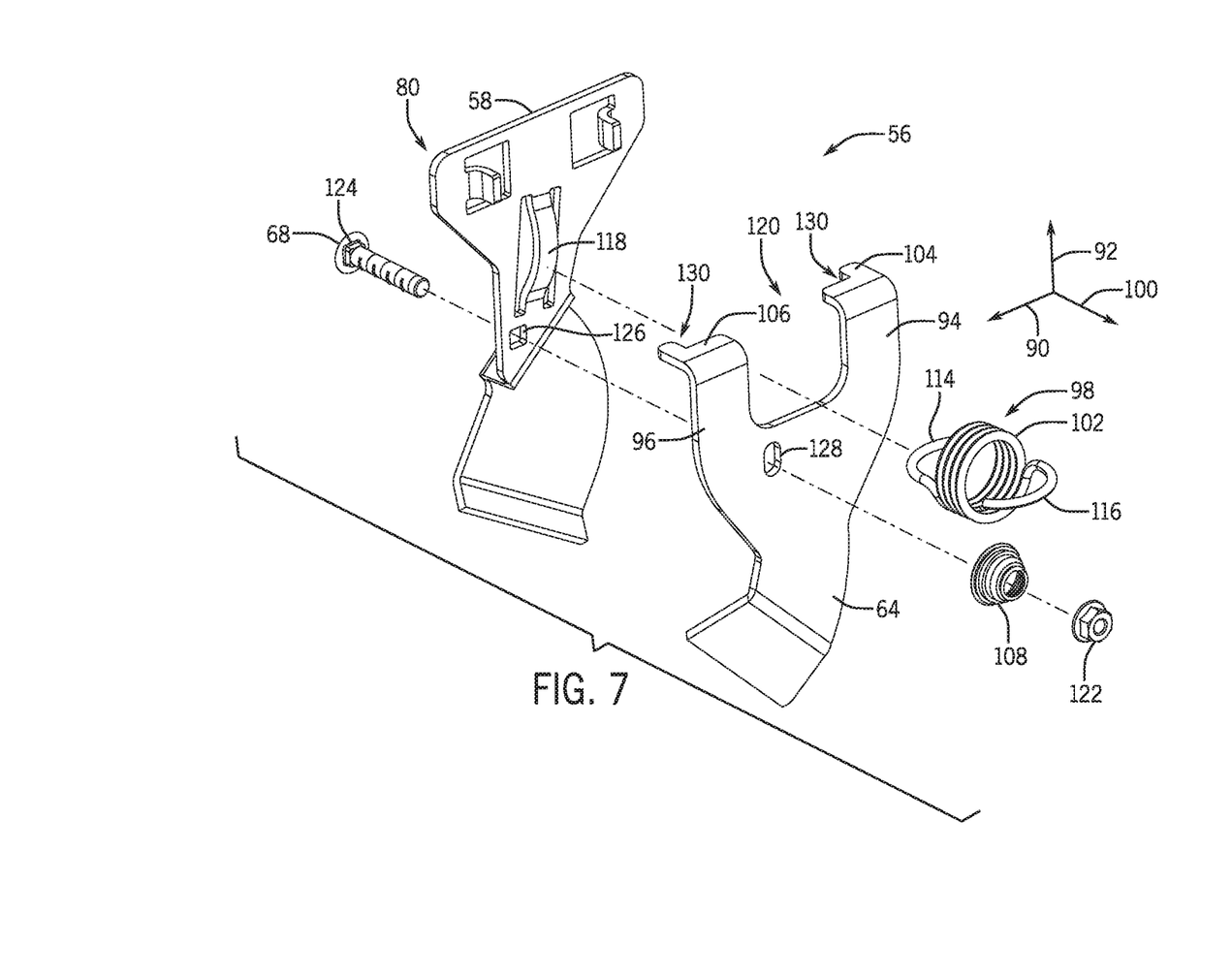
FIG. 7 is an exploded view of a portion of the scraper assembly of FIG. 3.

FIG. 7 is an exploded view of a portion of the scraper assembly 56 of FIG. 3. As previously discussed, the first fastener 68 couples the first outer scraper 58 to the first inner scraper 64. In the illustrated embodiment, the first fastener 68 includes a locking feature 124 configured to engage a corresponding locking feature 126 in the first outer scraper 58. Engagement of the locking features blocks rotation of the first fastener 68 relative to the first outer scraper 58, thereby facilitating engagement of the retaining element 122 with the first fastener 68 (e.g., via rotation of the retaining element/nut about a threaded portion of the first fastener). While the locking feature 124 of the first fastener includes a polygonal protrusion and the locking feature 126 of the first outer scraper 58 includes a corresponding polygonal recess in the illustrated embodiment, in other embodiments, the locking features may include any other suitable elements configured to block rotation of the first fastener relative to the first outer scraper 58. In further embodiments, the locking features may be omitted (e.g., thereby enabling the first fastener to rotate relative to the first outer scraper). In addition, the first inner scraper 64 has an opening 128 configured to facilitate passage of the first fastener 68 through the first inner scraper 64 to the retaining element 122. While the locking features and the opening are disclosed above with reference to the first inner and outer scrapers, substantially similar or different feature(s)/element(s) may be utilized for the second inner and outer scrapers to facilitate coupling the second fastener to the second inner and outer scrapers.

In the illustrated embodiment, the first arm 94 has a bent portion 104, and the second arm 96 has a bent portion 106. As previously discussed, a top surface of each bent portion is configured to contact the frame of the row unit to block rotation of the first inner scraper 64 about the first fastener 68 relative to the first outer scraper 58. In the illustrated embodiment, a notch 130 is formed within each bent portion, and each notch is configured to receive the first outer scraper 58. Accordingly, when the first outer scraper 58 is engaged with the notches 130, the bent portion of each arm contacts the first outer scraper, thereby blocking rotation of the first inner scraper 64 about the fastener 68 relative to the first outer scraper 58. While the illustrated bent portions include notches in the illustrated embodiment, in other embodiments, the notch may be omitted from at least one bent portion. In addition, in certain embodiments, at least one bent portion of the second inner scraper may include a notch configured to receive the second outer scraper.

While the illustrated inner scraper has arms positioned on opposite sides of the outer scraper, in other embodiments, the arms may be configured to contact the outer scraper in other ways to block rotation of the inner scraper about the fastener relative to the outer scraper. For example, the inner scraper may include at least one arm (e.g., engagement feature) having a protrusion configured to engage a recess in the outer scraper to block rotation of the inner scraper about the fastener relative to the outer scraper. Alternatively or additionally, the inner scraper may include a second fastener (e.g., engagement feature) configured to engage a recess in the outer scraper to block rotation of the inner scraper about the first fastener relative to the outer scraper. Furthermore, in certain embodiments, the outer scraper may include a protrusion configured to engage a recess (e.g., engagement feature) in the inner scraper to block rotation of the inner scraper about the fastener relative to the outer scraper. Alternatively or additionally, the outer scraper may include a second fastener configured to engage a recess (e.g., engagement feature) in the inner scraper to block rotation of the inner scraper about the first fastener relative to the outer scraper. In addition, in certain embodiments, the outer scraper may have at least one arm configured to contact at least one respective side (e.g., engagement feature) of the inner scraper to block rotation of the inner scraper about the fastener relative to the outer scraper. While the scraper assembly disclosed above is described with reference to opener discs, in certain embodiments, the scraper assembly may be utilized to remove accumulated soil from other suitable ground engaging discs (e.g., coulter discs, tillage discs, etc.).

Furthermore, the scraper assembly may include certain features configured to control rotation of the inner scraper about the longitudinal axis relative to the outer scraper/row unit frame. For example, in the illustrated embodiment, the bent portion of each arm is configured to contact an inner lateral side of the outer scraper 58, thereby establishing a pivot point for the inner scraper 64 about the longitudinal axis 90. Accordingly, the inner scraper 64 may rotate about the longitudinal axis 90 at the pivot point (e.g., against the force of the biasing member 108) during operation of the row unit (e.g., in response to movement/deformation of the opener disc and/or interaction with the accumulated soil on the opener disc). In addition, in certain embodiments, at least one arm (e.g., each arm of the pair of arms) may include a tab extending from the bent portion of the arm along the longitudinal axis and configured to contact an outer lateral side of the outer scraper. Accordingly, the outer scraper may be captured within a longitudinally extending slot formed by the tab, thereby blocking movement of the bent portion of the arm away from the outer scraper along the lateral axis. As a result, contact between the bent portion of the arm and the inner lateral side of the outer scraper may be substantially maintained while a force urges the inner scraper to move away from the outer scraper along the lateral axis, thereby substantially maintaining contact between the inner and outer scrapers at the pivot point.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A scraper assembly of an agricultural row unit, comprising:
    an inner scraper configured to engage an inner surface of a disc;
    an outer scraper configured to engage with an outer surface of the disc;
    a biasing member configured to urge the inner scraper toward the disc; and
    a fastener configured to couple the inner scraper to the outer scraper configured to engage the outer surface of the disc;
    wherein the inner scraper has an engagement feature configured to contact the outer scraper, a frame of the agricultural row unit, or a combination thereof, to block rotation of the inner scraper about the fastener relative to the outer scraper;
    wherein the biasing member comprises a coil spring disposed about the fastener.

2. The scraper assembly of claim 1, wherein the fastener is not directly coupled to the frame of the agricultural row unit, and the inner scraper is not directly coupled to the frame of the agricultural row unit.

3. The scraper assembly of claim 1, wherein the coil spring has a conical shape.

4. The scraper assembly of claim 1, wherein the engagement feature comprises a pair of arms, and the pair of arms are configured to be positioned on opposite sides of the outer scraper.

5. The scraper assembly of claim 4, wherein each arm of the pair of arms is configured to contact the outer scraper to block rotation of the inner scraper about the fastener relative to the outer scraper.

6. The scraper assembly of claim 1, wherein the engagement feature comprises an arm having a bent portion, and a top surface of the bent portion is configured to contact the frame of the agricultural row unit to block rotation of the inner scraper about the fastener relative to the outer scraper.

7. A scraper assembly of an agricultural row unit, comprising:
    an inner scraper configured to engage an inner surface of a disc;
    an outer scraper configured to engage an outer surface of the disc, wherein the outer scraper is configured to couple to a frame of the agricultural row unit;
    a fastener coupling the inner scraper to the outer scraper; and
    a biasing member configured to urge the inner scraper toward the disc;
    wherein the inner scraper has an engagement feature configured to contact the outer scraper, the frame of the agricultural row unit, or a combination thereof, to block rotation of the inner scraper about the fastener relative to the outer scraper;
    wherein the biasing member comprises a coil spring disposed abut the fastener.

8. The scraper assembly of claim 7, wherein the coil spring has a conical shape.

9. The scraper assembly of claim 7, wherein the engagement feature comprises a pair of arms, the pair of arms are positioned on opposite sides of the outer scraper, and each arm of the pair of arms contacts the outer scraper to block rotation of the inner scraper about the fastener relative to the outer scraper.

10. The scraper assembly of claim 7, wherein the engagement feature comprises an arm having a bent portion, and a top surface of the bent portion is configured to contact the frame of the agricultural row unit to block rotation of the inner scraper about the fastener relative to the outer scraper.

11. An agricultural row unit, comprising:
    a frame configured to rotatably support a first disc; and
    a scraper assembly, comprising:
        a first inner scraper configured to engage an inner surface of the first disc;
        a first outer scraper coupled to the frame and configured to engage an outer surface of the first disc; and
        a first fastener coupling the first inner scraper to the first outer scraper;
        wherein the first inner scraper has an engagement feature in contact with the first outer scraper, the frame, or a combination thereof, to block rotation of the first inner scraper about the first fastener relative to the first outer scraper;
        wherein the scraper assembly comprises a biasing member configured to urge the first inner scraper toward the first disc, and the biasing member comprises a coil spring disposed about the first fastener.

12. The agricultural row unit of claim 11, wherein the coil spring has a conical shape.

13. The agricultural row unit of claim 11, wherein the frame is configured to rotatably support a second disc, and the scraper assembly comprises:

a second inner scraper configured to engage an inner surface of the second disc;

a second outer scraper coupled to the frame and configured to engage an outer surface of the second disc; and a second fastener coupling the second inner scraper to the second outer scraper;

wherein the second inner scraper has an engagement feature in contact with the second outer scraper, the frame, or a combination thereof, to block rotation of the second inner scraper about the second fastener relative to the second outer scraper.

14. The agricultural row unit of claim 13, wherein the scraper assembly comprises a biasing system coupled to the first outer scraper and to the second outer scraper, and the biasing system is configured to urge the first outer scraper toward the first disc and the second outer scraper toward the second disc.

15. The agricultural row unit of claim 13, wherein the scraper assembly comprises:

a first biasing member configured to urge the first inner scraper toward the first disc, wherein the first biasing member comprises a first coil spring disposed about the first fastener; and a second biasing member configured to urge the second inner scraper toward the second disc, wherein the second biasing member comprises a second coil spring disposed about the second fastener.

* * * * *